(No Model.)
R. BEATTY.
FRUIT PICKER.
No. 595,034. Patented Dec. 7, 1897.
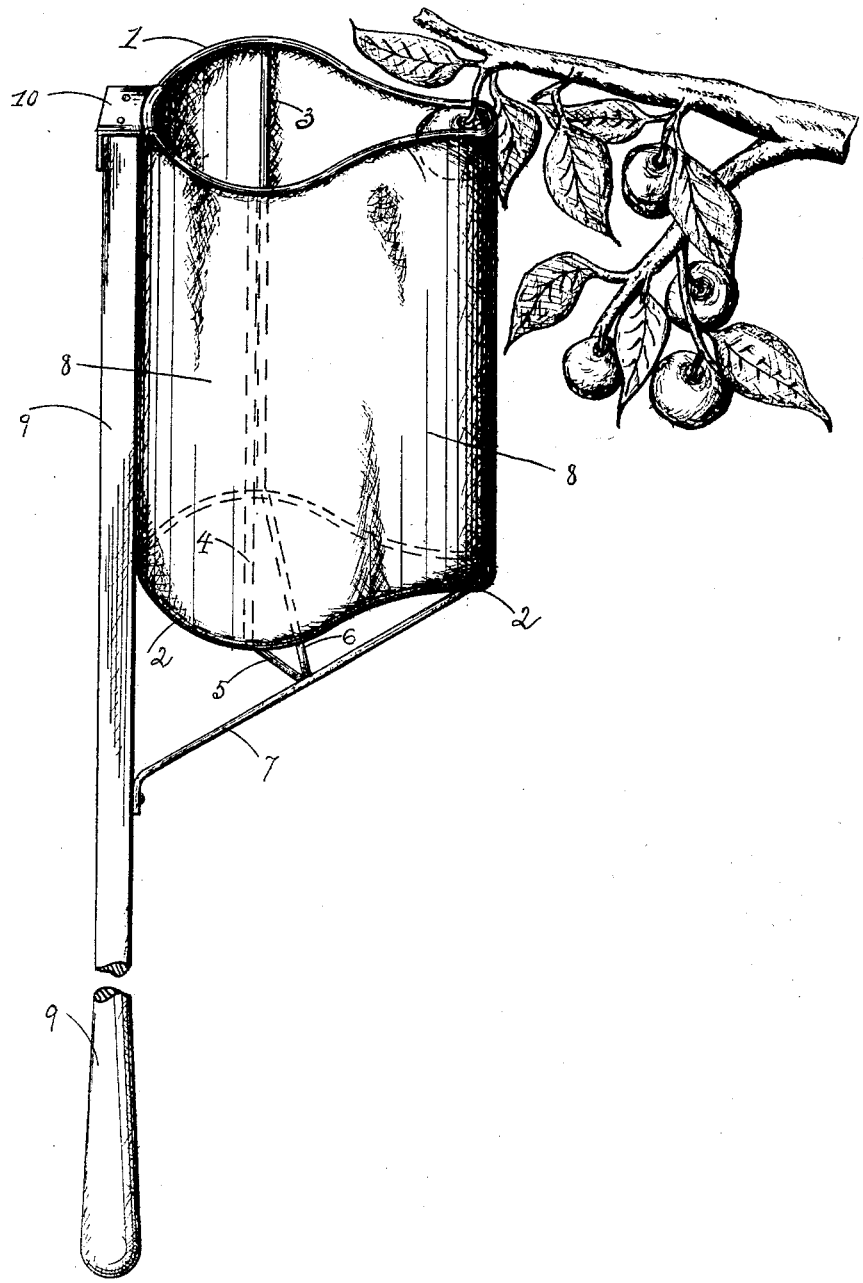
Witnesses:
C. R. Wassell
S. M. Rutledge
Inventor
Robert Beatty
By O. D. Levis
Att'y.

UNITED STATES PATENT OFFICE.

ROBERT BEATTY, OF TARENTUM, PENNSYLVANIA.

FRUIT-PICKER.

SPECIFICATION forming part of Letters Patent No. 595,034, dated December 7, 1897.

Application filed November 27, 1896. Serial No. 613,510. (No model.)

*To all whom it may concern:*

Be it known that I, ROBERT BEATTY, a citizen of the United States, residing at Tarentum, in the county of Allegheny and State of Pennsylvania, have invented certain new and useful Improvements in Fruit-Pickers; and I do declare the following to be a full, clear, and exact description of the invention, such as will enable others skilled in the art to which it appertains to make and use the same, reference being had to the accompanying drawing, and to the figures of reference marked thereon, which forms a part of this specification.

This invention relates to certain new and useful improvements in fruit-pickers.

The object of my invention is the construction of a device for picking and gathering the fruit from trees, and especially the fruit which is upon the upper branches of the trees and where it is beyond the reach of an ordinary person.

With the above object in view the invention finally consists in the novel construction, combination, and arrangements of parts to be hereinafter more specifically described.

In describing the invention in detail reference is had to the accompanying drawing, forming a part of this specification, wherein like figures of reference indicate similar parts, and in which the figure is a vertical perspective view of my improved fruit-picker, together with a portion of a fruit-tree, and showing the method of removing and securing the fruit.

To put my invention into practice, I construct a frame of wire or other suitable material, and which consists of the metal band 1, one end of which is of a semicircular shape and is gradually reduced in width, so that its opposite end portion terminates in an almost closed point or neck, as shown. Another band, 2, which may be of the same shape or circular in form, is provided for the bottom and the two joined together by the vertical brace-rods 3 and 4. Brace-rods 5, 6, and 7 are also connected to the bottom board and the rod 7, which is provided with an eye at its free end, so that it may be attached to a pole. The frame thus constructed is covered with canvas or other soft material 8, after which it is attached to the pole 9 by the end of the brace-rod 7 and the clip 10 at the top.

The operation of the device is as follows: The operator grasps the lower end of the pole and raises the bag or receptacle up, so that the fruit hangs down within the same. The pole is then given a movement sidewise, so that the stem of the fruit will be within the neck portion of the hoop or band, as shown in the drawing, and, as the neck of the hoop or band is only of sufficient width to allow the stem portion to enter, when the device is pulled downward the under side of the said band or hoop forms a shoulder against the fruit and the stem of the latter parts from the branch and falls into the bag. The operation is then repeated until the bag is full.

In the view shown the neck portion of the hoop or band is shown separated more than would be necessary in practice, as it should be only of sufficient width to admit the stem of the fruit.

Having thus fully shown and described my invention, what I claim as new, and desire to secure by Letters Patent, is—

A fruit-picker consisting of a pole having attached thereto a light framework, a covering for said framework, the said framework comprising the upper portion 1 and lower portion 2, one end being in semicircular form and adapted to be attached to the pole, the other end being gradually reduced in width, the vertical brace-rods 3 and 4, and the brace-rods 5, 6 and 7, said brace-rod 7 having one end secured to the said pole, substantially as described.

In testimony whereof I affix my signature in presence of two witnesses.

ROBERT BEATTY.

Witnesses:
ALBERT J. WALKER,
H. J. LEVIS.